United States Patent
Akiba (10) Patent No.: US 7,479,999 B2
(45) Date of Patent: Jan. 20, 2009

(54) PHOTODETECTION DEVICE AND METHOD

(75) Inventor: Makoto Akiba, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 1426 days.

(21) Appl. No.: 10/394,247

(22) Filed: Mar. 24, 2003

(65) Prior Publication Data
US 2003/0183750 A1    Oct. 2, 2003

(30) Foreign Application Priority Data
Mar. 26, 2002   (JP) ............................. 2002-085102

(51) Int. Cl.
*H04N 3/14* (2006.01)
*H04N 5/335* (2006.01)
*H04N 5/225* (2006.01)
*H04L 27/00* (2006.01)
*H04L 31/00* (2006.01)

(52) U.S. Cl. .................. 348/308; 348/294; 348/301; 348/310; 250/208.1; 250/214.1

(58) Field of Classification Search ............ 250/208.1, 250/214.1; 348/294, 301, 308, 310
See application file for complete search history.

(56) References Cited

U.S. PATENT DOCUMENTS 6,642,501 B2 * 11/2003 Mizuno et al. .......... 250/214 R
6,797,932 B2 *  9/2004 Takahashi et al. ........ 250/208.1
6,952,004 B2 * 10/2005 Henderson .............. 250/214 A

FOREIGN PATENT DOCUMENTS

| JP | 63-204645 | 8/1988 |
|----|-----------|--------|
| JP | 01-199170 | 8/1989 |
| JP | 5-095237  | 4/1993 |
| JP | 05-126864 | 5/1993 |

OTHER PUBLICATIONS

Makoto Akiba, "Dielectric Polarization Noise in Low-Noise Si Junction Field-Effect Transistors at 77K", Jpn. J. Appl. Phys. vol. 38(1999), pp. L558-L559.

Makoto Akiba, "1/f dielectric polarization noise in silicon p-n junctions", Appl. Phys. Lett. 71(22), Dec. 1, 1997, pp. 3236-3238.

(Continued)

*Primary Examiner*—Ngoc-Yen T Vu
*Assistant Examiner*—Chia-Wei A Chen (57) ABSTRACT

The photo-detecting device includes of a photodetector for detecting incident light, an input J FET for reading the sensing signal from the photodetector, an amplifier for amplifying the signal detected by the input J FET, a feed-back circuit for feeding the output of the amplifier back to the gate of the input J FET through a feed-back capacitor, a reset circuit for resetting the feed-back capacitor by discharging it with a reset MOS FET, and a circuit of a switch and resistor. The same level voltage as the gate voltage of the input J FET is applied to its source through a resistor, and the circuit of the switch and the resistor is connected between the source of the reset MOS FET and the feed-back capacitor. The reset MOS FET and switch are controlled so that the reset MOS FET is turned "on" and "off" while the switch is "on".

19 Claims, 6 Drawing Sheets

OTHER PUBLICATIONS

M.Fujiwara, M. Akiba and M. Sasaki , "Reduction method for low-frequency noise of GaAs junction field-effect transistor at a cryogenic temperature"; Communication Research Laboratory, Applied Physics Letters, vol. 80, No. 10, Mar. 11, 2002, pp. 1844-1846.

Makoto Akiba, "Effect of dielectric polarization noise on ultra-low-noise readout circuits", Proceedings of SPIE Reprint, The International Society for Optical Engineering, Infrared Technology and Applications XXVI, pp. 850-857, Jul. 2000.

Makoto Akiba, "Effect of Dielectric Polarization Noise on Infrared Readout Circuit for Detecting Weak Radiance", Journal of the Japan Society of Infrared Science and Technology, vol. 7, No. 2, Mar. 3, 1998, pp. 99-107/121.

* cited by examiner

PHOTODETECTION DEVICE AND METHOD

CROSS-REFERENCE TO RELATED APPLICATIONS

This application claims priority from Japanese Patent Application No. 2002-038102, filed Mar. 26, 2002 in Japan, the contents of which are incorporated herein for reference.

BACKGROUND OF THE INVENTION

1. Field of the Invention

The present invention relates to a hypersensitive photodetection device in which a CTIA (capacitive trans-impedance amplifier) or CIA (capacitive impedance amplifier) is applied to the detection of feeble incident light such as is found in fluorescence observation in chemistry and weak-light observation in astronomy.

2. Description of the Related Art

The sensitivity of infrared-ray sensors, i.e. sensors used to detect infrared rays, is increasing as semiconductor infrared-ray sensors and related peripheral-device techniques evolve. Two-dimensional infrared-ray sensor elements with detected noise levels of ten-odd electrons have been developed.

The detection noise of two-dimensional infrared-ray sensors has been decreased through reduction of the noise occurring in the detecting MOS FETs (metal oxide semiconductor field effect transistors), and their input capacitance and leakage current have been lessened, as well as through improvements in the performance of the two-dimensional infrared ray sensor. That is, for a given amount of photocurrent in the photodetector, a smaller input capacitance leads to a higher input gate voltage, and less leakage current leads to lower levels of shot noise.

MOS FETs are used in the readout circuits of two-dimensional infrared-ray sensors because of the small characteristics-dispersion, leakage current, and input capacitance of a MOS FET. However, the noise level of a Si J FET (silicon junction field effect transistor), is about 1/100 that of a MOS FET, while its input capacitance is in the range from a few to ten times as high.

On the whole, however, the low-noise Si JFET is expected to improve the S/N over that for a MOS FET. Actually, if we only consider the currently known forms of noise in a Si J FET, such as thermal noise and generation-recombination noise etc., we would expect to be able to obtain measured noise at the single-electron level in the band around the 10-Hz range.

However, success in the measurement of such a noise level has not been reported. Contradicting our expectations, one report stated that the low noise level seen when a J FET is used in an amplifier that has a low input impedance becomes several times higher when it is used in an amplifier with a high input impedance. This noise level is not explicable in terms of the shot noise of the leakage current. The increase in noise has been vaguely assumed to be because the storage noise is strengthened by the increase in input impedance.

Studies by the inventor of the present invention have shown that the dielectric polarization noise is dominant in the high input impedance case. The polarization noise is caused by the phenomenon of the thermal fluctuation of polarization, which is derived from the fluctuation-dissipation theorem as well as Johnson noise is derived from the theorem.

The polarization noise is the principal limit on the noise, because this noise is inevitable in a photodetector and J FET used as a sensor, that is, the noise is inherent to the materials. The detected noise of the prior-art photodetection device has not approached the theoretically limiting range of noise levels because of noise generated by the leakage current or and other noise sources of the FET.

Figure 7:
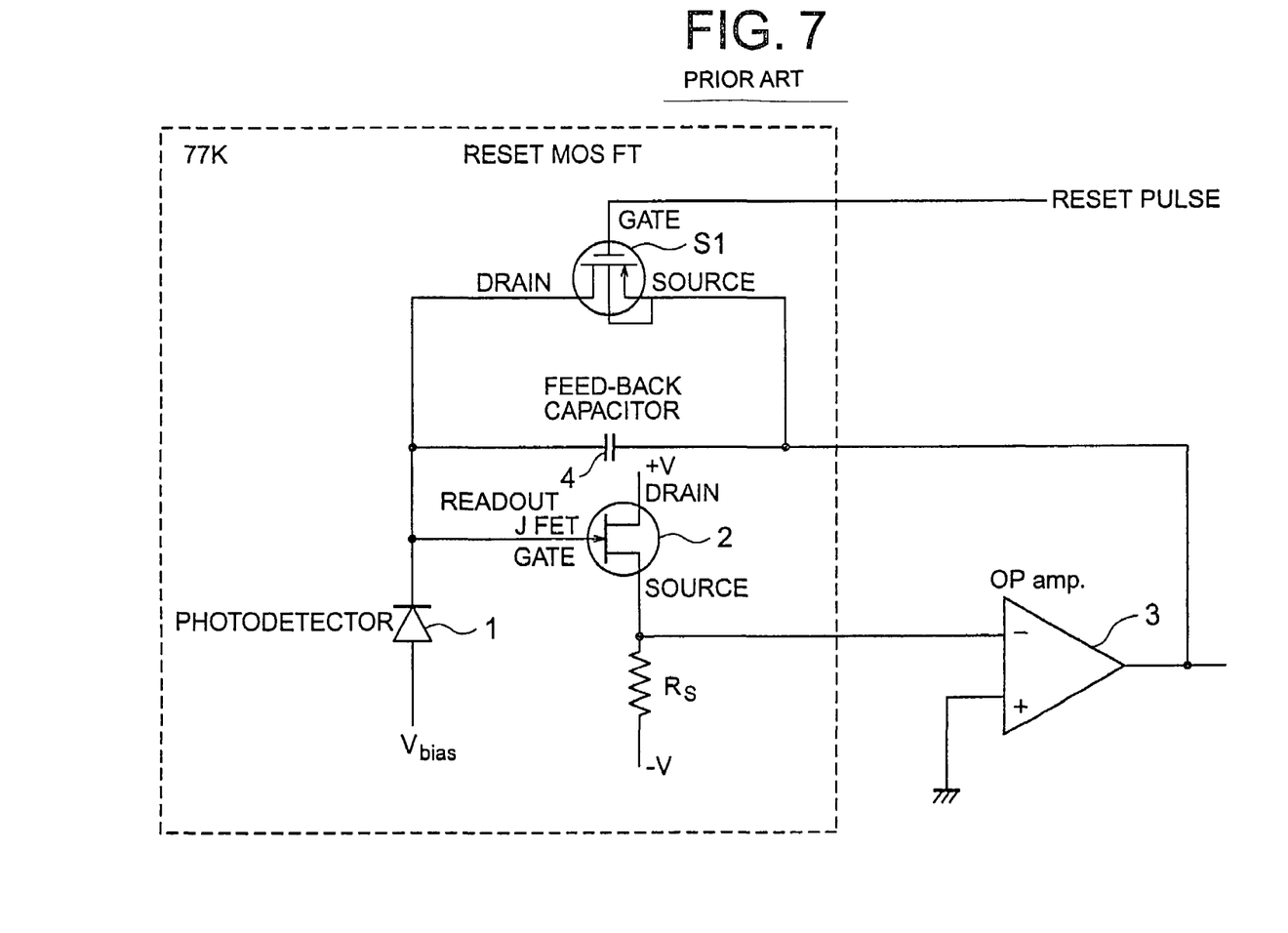
FIG. 7 is a drawing of an example of a circuit of the prior art in photo sensing.

FIG. 7 shows an example of the circuit for a photodetector of the prior art. A CTIA circuit, which is an orthodox circuit and in generally use in photodetection devices, is used in the photodetection device of the prior art shown in FIG. 7.

The CTIA circuit is a TIA (Trans-Impedance Amplifier) in which a capacitor replaces a resistor of the feed-back circuit. A resistor induces thermal noise which determines the limit on the detection of light, but the capacitor in the feed-back loop induces little thermal noise and improves the limit on the detection of light.

However, the photocurrent does not disappear outside the circuit, and charges up the capacitor. We thus need to evacuate the accumulated charge with appropriate timing. This action is called a reset, while the step of measuring the photocurrent is called carrier accumulation (charging of the capacitor).

The photo detection circuit consists of the photodetector that detects incident light (for example, a photodiode) 1, a J FET 2 for reading out the detected light the detection of light, an op amp. (operational amplifier) 3 that amplifies the detection signal, the feed-back loop that feeds the output of the op amp. 3 back to the gate of the J FET 2 through the capacitor 4, and the reset circuit that resets the capacitor 4 by discharging the capacitor 4 through a MOS FET, S1.

Furthermore, the photodetector (for example, a photodiode) 1, input J FET 2 for readout, capacitor 4 and MOS FET S1 are placed in a cryogenic vessel which is cooled down to a cryogenic temperature (for example 77 K), while the amplifier 3 is placed at room temperature.

In this case, the elements in the cryogenic vessel are connected with the op amp. 3 by conductors. Also, the reset pulse to reset the MOS FET S1 can be applied with a control circuit (not shown in the figure) situated outside the vessel, with conductors connecting the MOS FET S1 and this control circuit.

In the above circuit, a feed-back capacitor 4 replaces a resistor of the TIA circuit which is generally used in infrared-ray readout circuits. To give the TIA circuit a large S/N, as large a resistance value as is possible is chosen for the resistor of the overall TIA circuit's feed-back circuit. Johnson noise is thus the dominant form in which noise is generated, and this prevents the detection of infrared rays. When the feed-back capacitor 4 is used in the feed-back loop, the photocurrent provides charge that accumulates in the feed-back capacitor 4, so the CTI circuit is provided with the MOS FET 1 for resetting as a reset switch that discharges the feed-back capacitor 4.

Furthermore, since a very high input impedance is needed to detect the weak radiance of infrared rays, an FET is used in the input circuit. An FET can operate at low temperatures, and can thus be placed very close to the cooled sensor; that is, the length of the high-impedance portion is wired to a short length. While the op amp. is placed at room temperature, all devices other than the OP amp. are set in the cryostat of liquid nitrogen.

The circuit contains noise sources of various kinds that originate in the device elements. However, if we consider the behavior of the circuit, the noise sources can be classified into two types. One type covers the noise voltages generated in the source circuit of the J FET 2, which is the input FET. This noise includes all noise generated in the channel of the J FET 2 and the input-referred noise of the OP amp. Both noise voltages and noise current are referred to as input noise of the OP amp.

However, as the current noise is converted to voltage by the output impedance of the input J FET 2 for readout (henceforth referred to as the input J FET), the current noise can be included with the voltage noise. The noise when converted to current noise at the gate of the input J FET 2 is to be compared with the photo current. The input-referred noise current to the input J-FET can be obtained by dividing the noise voltage with input impedance of the J-FET. S/N of the photodetctor is measured from comparing the photocurrent of the photodetector with the input-referred noise current.

The other kind of noise is that which flows directly into the gate circuit of the input J FET 2, for example the shot noise of the leakage current of the photodetector and the input J FET 2 for readout, and gate-induced noise of the JFET 2. The polarization noise of devices connected to the gate circuit is also of this kind. Noise of this kind is converted to input current noise, and is thus referred to as gate current noise.

The respective two kinds of noise mentioned above can be measured by using the dependence of input impedance. The noise is converted to the referred noise voltage to op amp. 3 output by multiplying the feed-back impedance to the input referred noise current. Thus referred noise voltage of the source noise to op amp. 3 output is proportional to the ratio of the input impedance to the feed-back impedance, while the current noise at the gate is proportional to the feed-back impedance alone.

Thus, lowering the input impedance and feed-back impedance such that the ratio is kept constant reduces the current noise at the gate to negligible levels. On the other hand, when both of the impedances are increased, the current noise returns to measurable levels.

In the prior-art photodetection device, the MOS FET S1 is connected in parallel with the feed-back capacitor 4. In this connection, the voltage between the electrodes of the feed-back capacitor 4 is applied directly across the source and drain of the MOS FET S1, and this induces a leakage current between the source and drain of the MOS FET S1.

Thus, even when the MOS FET S1 is off, the flow of some leakage current between the source and drain is inevitable whenever any voltage is applied across them. Thus, the noise is not reducible in spite of the use of the feed-back capacitor 4 in the photodetection device; this prevents high sensitivity in photodetection.

When a photodetector that has a larger light-incident area is used so that more light is received, the capacitance of the photodetector inevitably increases. On the other hand, the limit on the sensitivity of photodetection is determined by the noise level of the input J FET that reads out the detection signal. The input-referred noise of the input J FET is proportional to the capacitance of the photodetector; however, the polarization noise is proportional to the square root of the capacitance. Thus, as the capacitance of the photodetector is increased, the input-referred noise of input J FET becomes dominant. Reducing the noise level to the limit imposed by polarization noise is thus difficult with the prior-art photodetection device.

SUMMARY OF THE INVENTION

One objective of the present invention is to solve the problems with the prior art and reduce the noise in the photodetection device by as much as is possible, thus improving the sensitivity of photosensing. The present invention consists of the following constructions for solving the problem.

Figure 1:
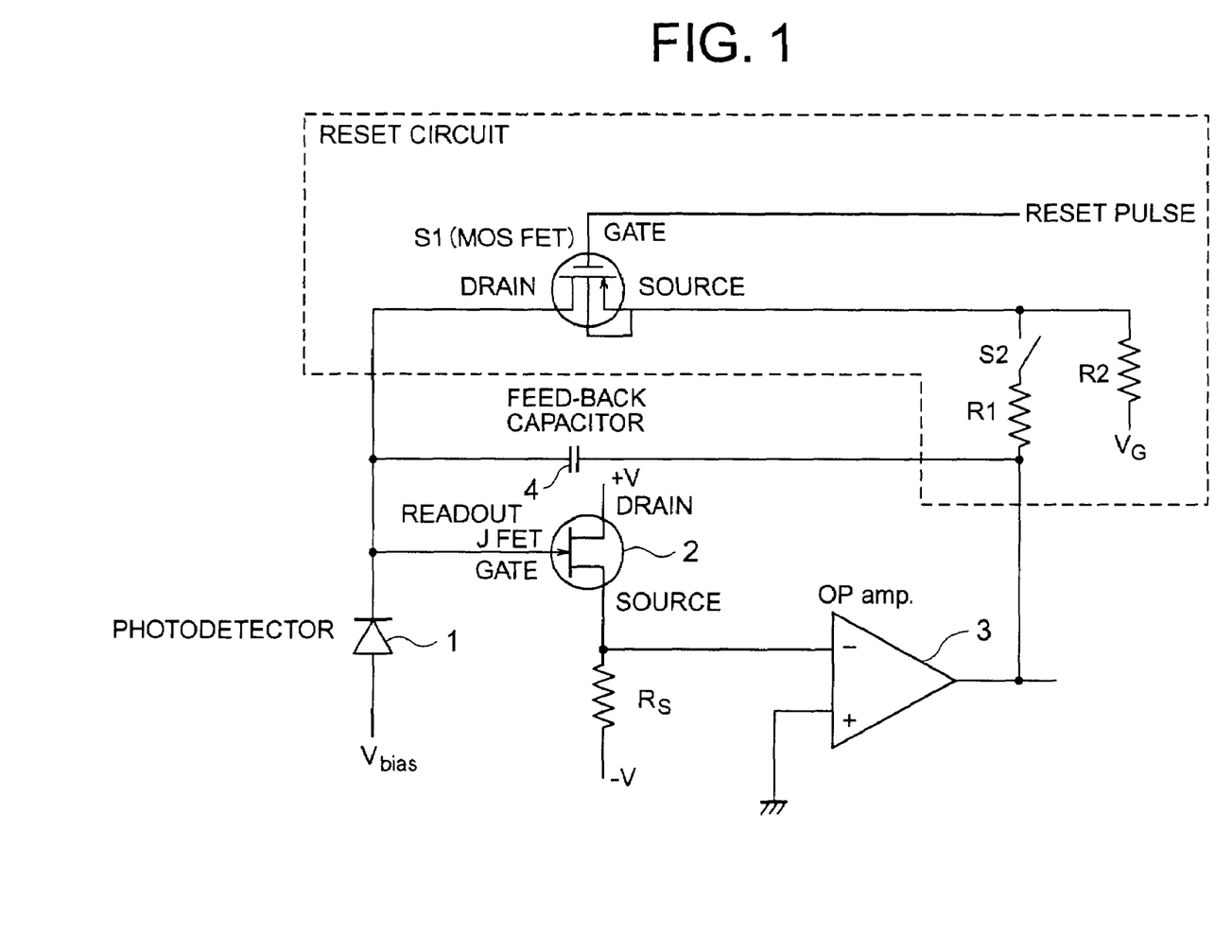
FIG. 1 is a drawing that gives an example of the circuit of photodetection device A of the present invention.

Photodetection device, that is a photo-detecting device, A of the present invention, which corresponds to FIG. 1, includes a photodetector for the detection of incident light, an input J FET for reading out of the detection signal from the photodetector, an amplifier for amplifying the signal detected by the input J FET, a feed-back circuit that feeds the output of the amplifier back to the gate of the input J FET through a feed-back capacitor, a reset circuit that resets the feed-back capacitor by discharging its charge through a MOS FET (henceforth referred to as a reset MOS FET), and a circuit made up of a switch and resistors. The same voltage as is at the gate of the input J FET is applied to the source (or drain) through a resistor, and the circuit composed of the switch S2, and resistor is connected between the source (or drain) of the reset MOS FET (which corresponds to the MOS FET S1 in FIG. 1) and the feed-back capacitor. The reset MOS FET and the switch S2 are controlled so that the reset MOS FET is turned "on", while the switch 2 is "on". That is, the reset MOS FET is turned "on" and the "off", when the switch S2 is "on". After that the reset MOS FET is turned "off", the switch S2 is turned "off". Resetting of the feed-back capacitor is carried out while the reset MOS FET and the switch S2 are "on".

The reset circuit is thus only inserted in the feed-back loop at the time of a reset, and the source (or drain) of the reset MOS FET can be kept at the same voltage as the gate of the input J FET while the feed-back capacitor is being charged.

In the prior art, on the other hand, the reset MOS FET is configured in parallel with the feed-back capacitor. The voltage applied to the feed-back capacitor is thus applied directly across the source and drain of the reset MOS-FET, and induces a leakage current. This leakage current is inevitable whenever a voltage is applied across the source and drain, even when the reset MOS FET is "off". In the present invention, on the other hand, this leakage current is avoided by having the source (or drain) of the reset MOS-FET at the same voltage as the gate of the input J FET.

Moreover, applying the switching circuit to the reset circuit allows us to separate the reset MOS FET from the output of the amplifier during charging of the feed-back capacitor. In addition, the reset MOS FET is connected to a resistor so as to avoid large fluctuations of voltage at the source (or drain) of the reset MOS FET during a reset.

Acertain gate voltage, which is decided from the source (or drain) voltage of the reset MOS FET, has to be applied to make the reset MOS FET turn "on" and reset the feed-back capacitance. The source (or drain) of the reset MOS FET is connected to the output of the amplifier, so that the source voltage varies with the output voltage of the amplifier. However, connecting a resistor between the source (or drain) and the output of the op amp. keeps variation at the source (or drain) of the reset MOS FET from varying greatly, even when the output voltage is varied. The reset MOS FET is thus controllable regardless of the voltage output by the amplifier. In the above explanation J FET is used as an input element for reading out of the detection signal of the photdetector. But other FETs such as MOS-FET etc. are usable as the input element.

Figure 3:
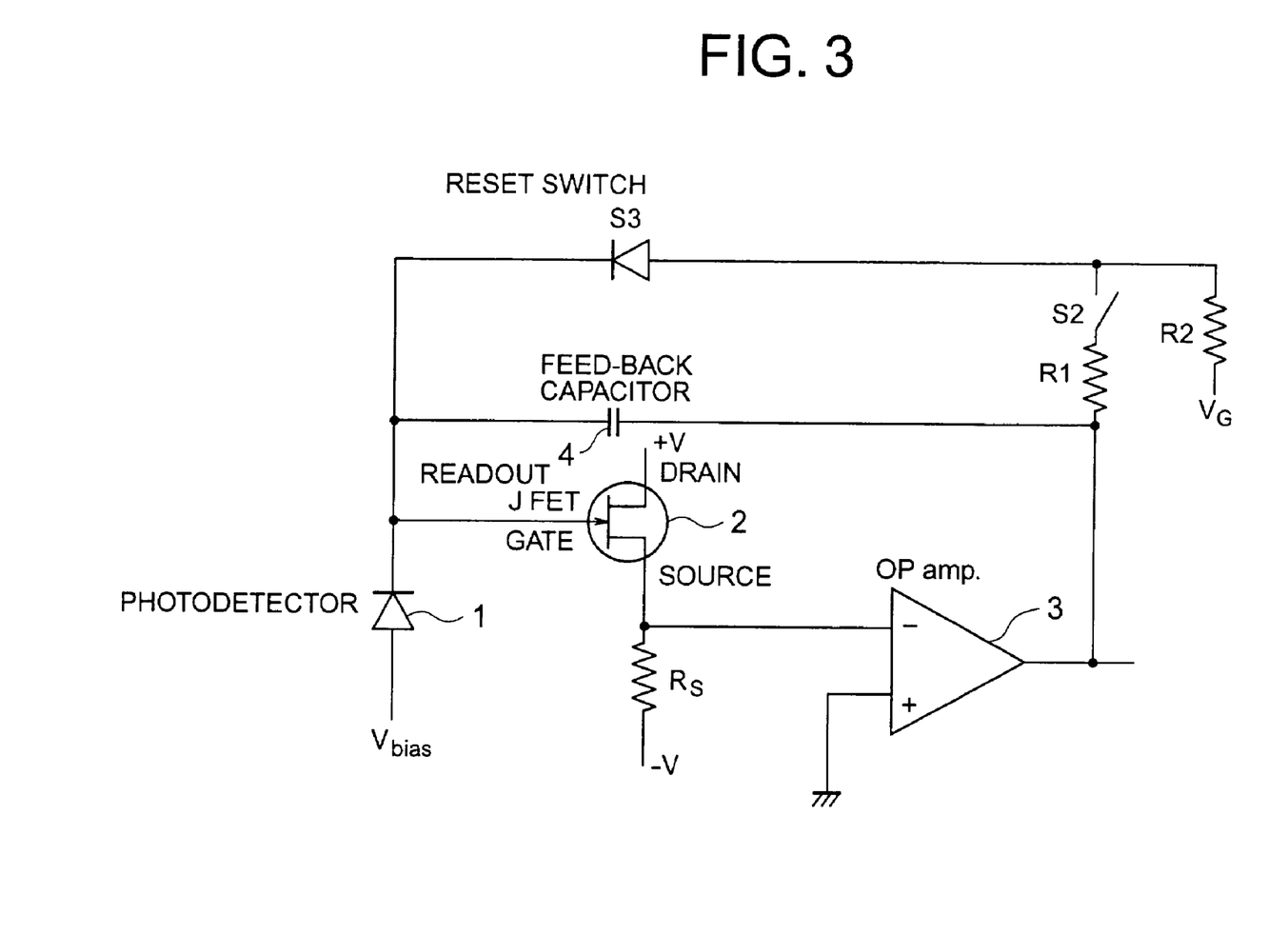
FIG. 3 is a drawing that gives an example of the circuit of photodetection device B of the present invention.

The photodetection device, that is a photo-detecting device, B of the present invention corresponds to FIG. 3 is comprised of a photodetector for the detection of incident light, an input J FET for reading out of the detection signal from the photodetector, an amplifier for amplifying the signal detected by the input J FET, a feed-back circuit to feed the output of the amplifier back to the gate of the input J FET through the feed-back capacitor, a reset circuit that resets the feed-back capacitor by discharging its charge through a pn-junction element for resetting the capacitor (henceforth referred to as a reset pn-junction element) and the circuit made up of switch S2 and a resistor. The same voltage as at the gate of the input J FET is applied to the reset pn-junction element through a resistor, and the circuit made up of switch S2 and a resistor is connected between the reset pn-junction element and the feed-back capacitor. The circuit has feature that, following turning the second switch to "on", the first switch turns automatically to "on".

The polarization noise of a MOS FET is not generally so weak. Thus, when a MOS FET is used as the reset switch, the polarization noise of this MOS FET is dominant in the noise of the photodetecton device, and the detection limit of the photodetection device is decided by the noise of the MOS FET. Using the pn-junction element instead of the MOS FET in the resetting circuit reduces the polarization noise.

Furthermore, the reset pn-junction does not need the reset pulse which is required to make the reset MOS FET of the photodetection device A turn "on". The circuit can thus be simplified. In addition, applying the same technique to the photodetector by using the reset pn-junction element eases fabrication of the photodetection device.

Figure 4:
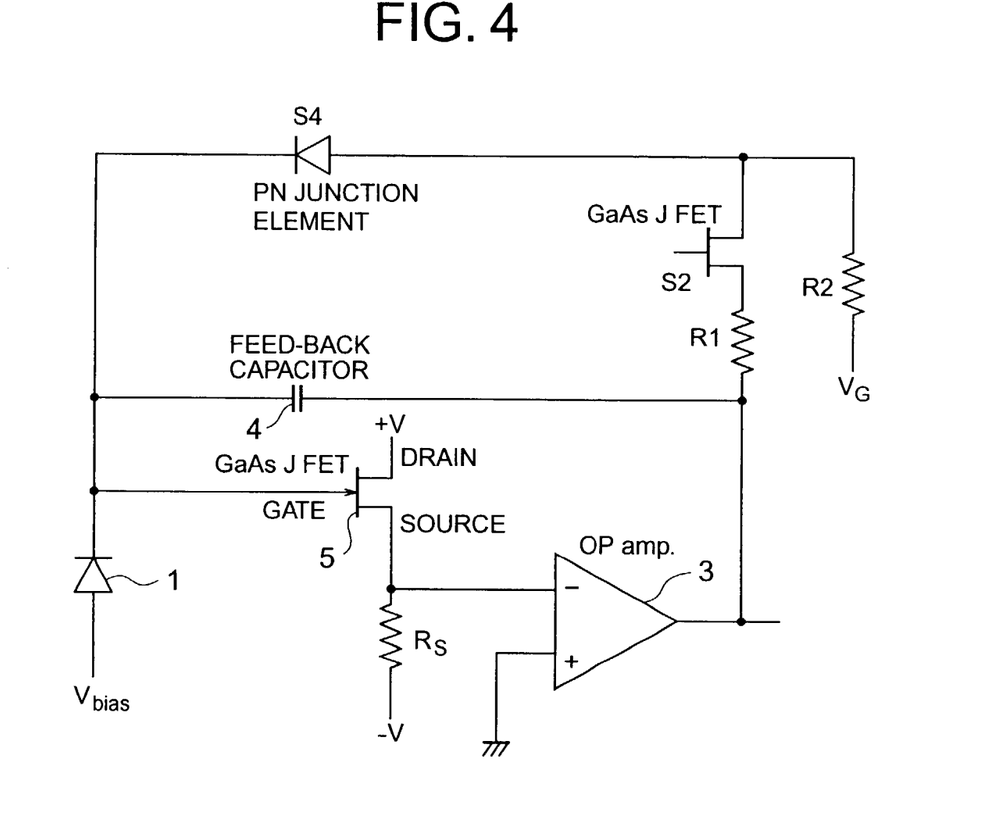
FIG. 4 is a drawing that gives an example of the circuit of photodetection device C of the present invention.

The photo-detecting device, that is a photo-detecting device, C of the present invention corresponds to FIG. 4 has the same structure as photodetection device B except that the input J FET, reset pn-junction element, and switch S2 are made of a compound semiconductor, such as GaAs semiconductor. The action of the photodetection device C is also the same as that of the photodetection device B.

In the photodetection device C, too, the polarization noise is reducible by using a compound-semiconductor pn-junction element rather than a reset MOS FET as the reset switch for resetting of the photodetection device A.

Following turning the switch S2 to "on", the reset pn-junction element turns automatically to "on". The reset pulse is not needed thus, and the circuit is simplified. Making the pn-junction switch S3 with the same materials such as compound semiconductor with the material of J-FET 2 is convenient, because the pn-junction switch S3 and the J-FET are integrated to an integrated circuit. Further, the material of S3 is selectable from the same materials with the pn-junctin element 3 and input J-FET 2. In this way, input J-FET 2, pn-junction element 2 and switch S2 are integrated as an integrated circuit. This makes the fabrication of photodetection devices of the present invention more easy.

Figure 5:
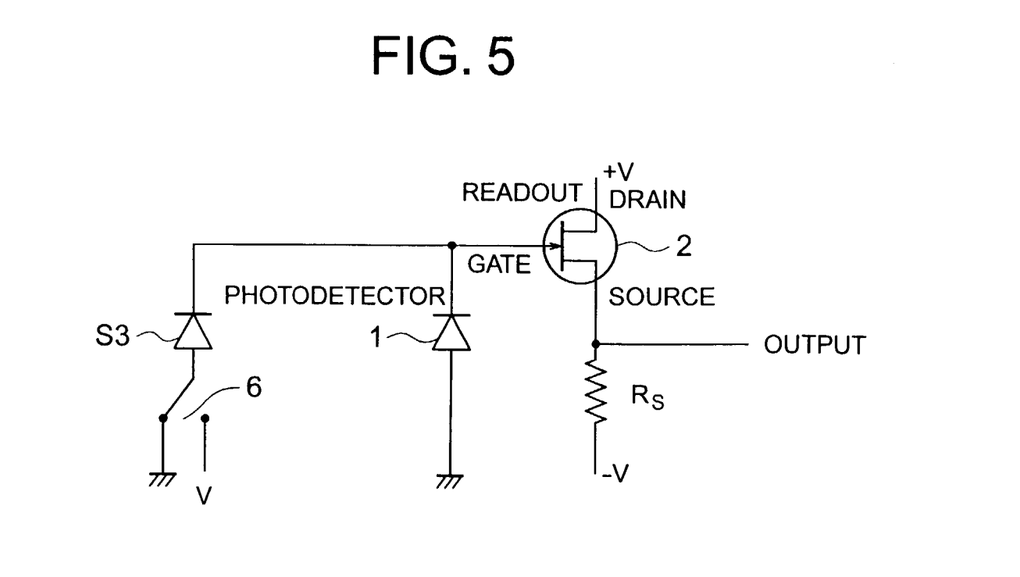
FIG. 5 is a drawing that gives an example of the circuit of photodetection device D of the present invention.

Photo-detecting device, that is a photo-detecting device, D of the present invention, which corresponds to FIG. 5, is comprised of a photodetector for the detection of incident light, a J FET for reading out of the detection signal from the photodetector, a reset pn-junction element which is connected to the gate of the input J FET, and a switch to turn the reset pn-junction element "on" and "off". The reset pn-junction element S3 resets the phtodetector 1 by discharging the pn-junction capacitor of the phtodetector and/or the gate capacitor of the input J FET 2. The switch S3 is controlled by a controlling means not shown in FIG. 5.

Using the pn-junction element as the reset switch of the reset circuit in this way is applicable to the CIA circuit of the photodetection device D as well as to the CTIA circuits of the photodetection devices B and C. Moreover, the circuit structure is simplified since a reset can be performed by simply applying forward bias to the pn-junction element for resetting.

The structure of photodetection device, that is a photo-detecting device, E is comprised of multiple photodetectors. The area of the photodetecting chip is 1/n of the chip area of the photodetecting chip of the above mentioned photodetectors. Further the n photo-incident planes are electrically connected in series with each other. For example, the photo-incident planes of each of the photodetectors are set in parallel each other, and the area of each of the photo-incident planes is S/n, where S is the area of all of the photo-incident planes and is the photo-sensing plane area of the set of photodetection devices A-D (see FIG. 6), each of which is henceforth referred to as a standard photodetector.

Figure 6:
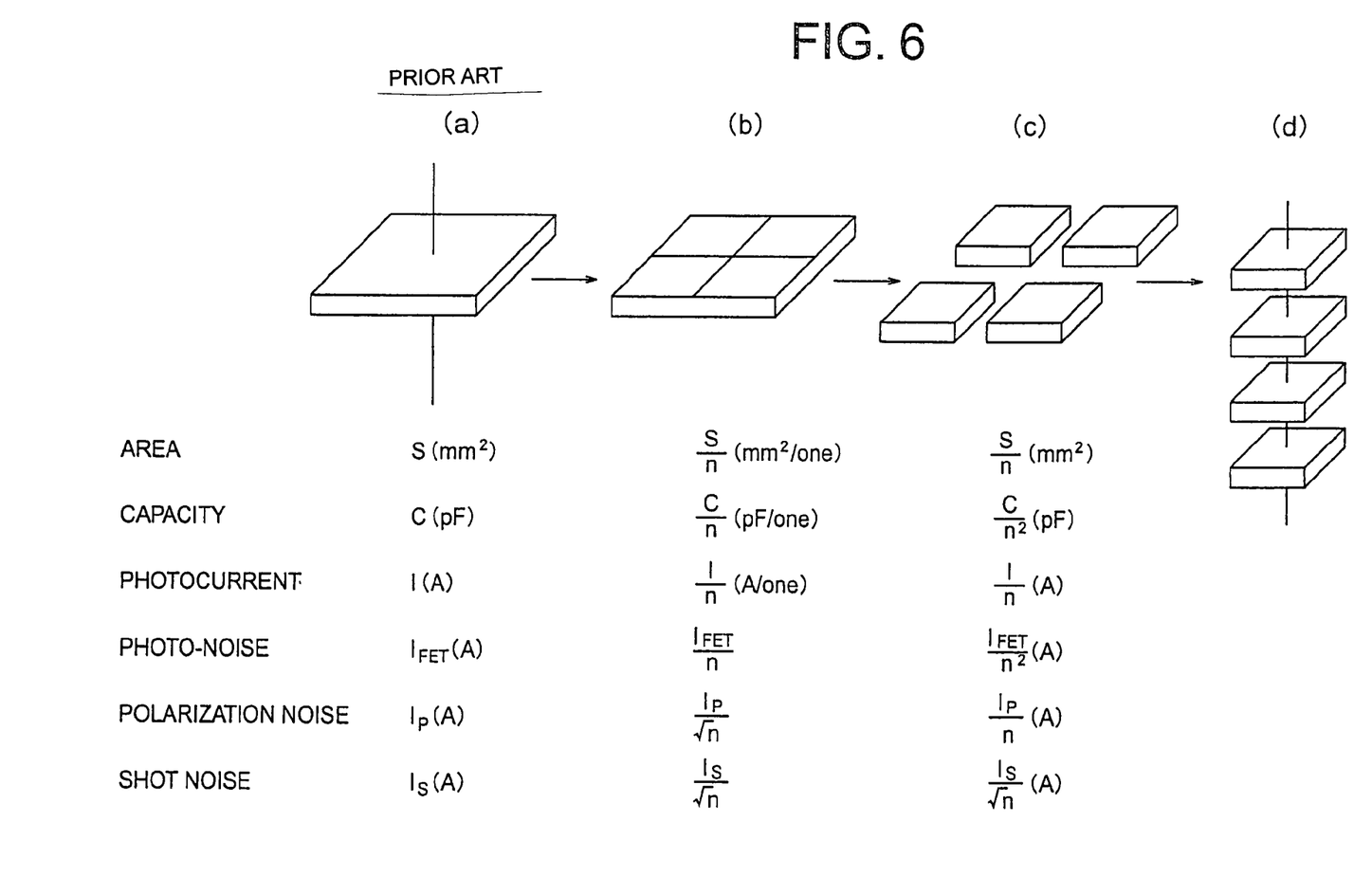
FIG. 6 is a drawing that gives an example of the circuit of photodetection device E of the present invention.

The total light-incident area of the photodetectors is equivalent to the light-incident area of the standard photodetector. However, the photocurrent of the photodetection device E is 1/n that of the standard photodetector, and the total capacitance of the photodetection device E is $C/n^2$, where C is the capacitance of the standard photodetector. Furthermore, as the input-referred noise of J FET is proportional to the capacitance of the photodetector, the noise of the photodetection device E is reduced to $1/n^2$ that of the given photodetection device A-D used as the standard photodetector.

However, the level of polarization noise is 1/n because the polarization noise is proportional to the square root of the capacitance. So, increasing n more strongly reduces the input-referred noise of the J FET than the photocurrent, thus improving the S/N ratio of the photodetection device. Furthermore, when increasing the n, the input-referred noise level of the J FETs comes to equal to the polarization noise level at a "$n_0$" of "n". Increasing the n from "$n_0$" furthermore, the input-referred noise level of the J FETs comes less than the polarization noise level, the polarization dominates the overall noise. In the situation that the input-referred noise level of the J FETs is less than the polarization noise level, the noise level falls by 1/n as n increases. As the photocurrent is reduced at the rate of 1/n, the S/N ratio of the photodetection device E does not change.

Moreover, in the case where the shot noise of the leakage current is dominant, 1/n of the leakage current lowers the level of shot noise by $1/n^{1/2}$. The shot noise is thus reduced at a slower rate than the reduction in the photocurrent, and the S/N is accordingly reduced.

The present invention is effective in application at room temperature. The input circuit for reading out of the signal detected by the photodetector is not limited to a J FET, and the switch S1 is not limited to a MOS FET or pn-junction element. For this reason, the scope of the present invention covers the following structure.

This photodetection device consists of a photodetector for the detection of incident light, a signal-readout element for reading out the signal detected by the photodetector, an amplifier for amplification of the readout signal of the signal-readout element, a feed-back circuit for feeding the output of the amplifier back to the gate of the signal-readout element through a feed-back capacitor; a reset circuit used to reset the feed-back capacitor by discharging the feed-back capacitor through a first reset switch; a second reset switch connected between the first reset switch and the feed-back capacitor; the first switch is connected between the gate of the signal-readout element and the output of the amplifier through the second reset switch. In addition, control is comprised of control contributed by the first switch and the second switch. Control means control of the first and second reset switches such that the first reset switch is turned "on" and then "off" while the second reset switch is "on". The second switch is only turned "off" after the first reset switch has been turned "off". The feed-back capacitor is reset while the first and second reset switches are "on".

The other present invention is a photo-detection method for a photodetection device, and is composed as follows. This photodetection device consists of a photodetector for the detection of incident light, a signal-readout element for reading out the signal detected by the photodetector, an amplifier for amplification of the readout signal of the signal-readout element, a feed-back circuit for feeding the output of the amplifier back to the gate of the signal-readout element through a feed-back capacitor; a reset circuit used to reset the feed-back capacitor by discharging the feed-back capacitor through a first reset switch; a second reset switch connected between the first reset switch and the feed-back capacitor; the first switch is connected between the gate of the signal-readout element and the output of the amplifier through the second reset switch. The first reset switch and the second reset switch are controlled so that the first reset switch is turned "on" and "off" while the second reset switch is "on". The second switch is turned "off" after the first reset switch has been turned "off". The feed-back capacitor is reset while the first and second reset switches are "on".

The objectives, advantages and features of the present invention will be more clearly understood with reference to the following detailed disclosure and the accompanying drawings.

DETAILED DESCRIPTION OF THE PREFERRED EMBODIMENTS (i) Explanation of the Example Circuit for Photodetection Device A.

FIG. 1 shows an example of the circuit of the photodetection device A, in which noise is reduced to the utmost limit as much as possible by the use of the CTIA circuit, which was explained as the prior art. The explanation of photodetection device A is as follows.

Photodetection device A is comprised of the photodetector 1 (for example a photo-diode) for detecting incident light, the input J FET 2 for reading out of the sensing signal detected by the photodetector, the op amp. 3 for amplifying the signal detected by the input J FET 2, the feed-back circuit for feeding of the output of the op amp. 3 back to the gate of the input J FET through the feed-back capacitor 4, the reset circuit for resetting feed-back capacitor 4 by discharging it through the reset MOS FET S1 and a circuit formed by a switch and resistor R1. Voltage at the same level as the gate voltage $V_G$ of the input J FET 2 is applied to the source (or drain) through resistor 2, and the circuit of switch S2 and resistor 2 is connected between the source (or drain) of the reset MOS FET S1 and the feed-back capacitor 4. The reset MOS FET S1 and switch S2 are controlled so that the reset MOS FET S1 is turned "on" and "off" while the switch S2 is "on". The switch S2 is turned "off" after the reset MOS FET has been turned "off". Resetting of the feed-back capacitor is performed while the reset MOS FET and switch S2 are "on".

In this circuit, reset pulses are applied by an external circuit to the gate of the reset MOS FET S1. In the example, the pulse-generating circuit and control circuit (not shown in the figure) are configured so as to generate and supply pulses with an appropriate timing to the gate of the reset MOS FET S1. The pulses generated by the pulse-generating circuit are passed through an LPF (low-pass filter) to reduce their high-frequency components, and are then supplied to the gate of the reset MOS FET S1.

Furthermore, the switch S2 can take the form of a mechanical switch or electromagnetic relay etc., or can be realized as a transistor switch. A photodiode or some known photodetector other than a photo-diode can be used as the photodetector 1.

In the above-mentioned example of the circuit of photodetection device A, the reset circuit is only inserted in the feed-back circuit while the reset is being applied; in charging of the feed-back capacitor, the source voltage of the reset MOS FET S1 is kept at the same level as the gate voltage of the input J FET 2. In the prior art, on the other hand, the reset MOS FET S1 is always connected in parallel with the feed-back capacitor. The voltage between the electrodes of the feed-back capacitor 4 is thus always directly applied across the source and drain of the reset MOS FET S1, and thus induces leakage current.

This leakage current is inevitable with the prior art, since some voltage is applied across the source and drain even when the reset MOS FET S1 is "off". In the present invention, however, this leakage current is avoided by having the source (or drain) voltage of the reset MOS FET S1 at the same voltage level as the gate voltage of the input J FET 2.

The switch S2 separates the reset MOS FET S1 from the output of the amplifier during charging of the feed-back capacitor. The resistors R1 and R2 divide the output of the op amp. 3 and reduce the voltage applied to the source. Reducing the voltage applied to the source avoids the effect of a reset inducing large fluctuations on the source of the reset MOS FET S1.

To make the reset MOS FET S1 turn "on" for a reset, a level of voltage which varies with the source voltage has to be applied to the gate (whether the voltage is positive or negative and the voltage value differs from FET to FET). The source of the reset MOS FET S1 is connected to the output of the amplifier, so that the source voltage varies with the output voltage of the amplifier. The resistors R1 and R2 are inserted to prevent the induction of large fluctuations at the source of the reset MOS FET S1 by variations in the voltage output by the op amp. 3.

With regard to gate-source voltage, the source voltage during reset operation is low enough that the reset MOS FET S1 is certain to be "on" at any output voltage of the op amp. 3. For example, if the gate-source voltage at which the reset MOS FET S1 is "on" is about −3 V, the source voltage in the reset action has to be at least −0.1 V.

As the maximum output voltage of the op amp. is set to ±18 V, the resistors R1 and R2 are selected so that $\frac{1}{100}$ of the voltage output by the op amp. 3 is applied to the source during the reset action. In addition, the resistor R1 has to be sufficiently larger than the "on" resistance of S2. It would be possible for another system to apply the necessary voltage to the gate of the reset MOS FET S1, taking account of variation in the source voltage of the reset MOS FET S1. The above-mentioned system is the simplest.

The maximum output voltage of an op amp. is generally determined by the voltage of the power supply for the op amp. If amplification is to be applied by a stage after op amp. 3, the output voltage of the op amp. 3 has to be lower than the maximum output voltage so that the output of the final amplifier does not go into saturation. That is, the maximum output of the CTIA circuit should be 1/(maximum output amplification at the final stage). The ratio of R1 to R2 thus does not have to be extremely large.

However, the output of the CTIA circuit may occasionally becomes the maximum voltage because of strong incident light. If we consider such cases, the R1 and R2 values have to be decided on the basis of the characteristic maximum voltage for the op amp. used in the CTIA circuit.

Application of the resistors has the following merits. As the switch S2 is inserted in series with the resistor R1, its "on" and "off" resistance affects the division ratio of the output of the op amp. However, as long as the "off" resistance of the switch S2 is sufficiently greater than the resistor R1, the voltage applied to the source of the reset MOS FET S1 remains sufficiently low that the leakage current during discharge is negligible.

Thus, switch S2 need not have an extremely high "off" resistance. It can thus be kept at room temperature (the "off" resistance is far lower at room temperature than at low temperatures). This is important when the reset circuit is one in which a reset MOS FET is not used, as is later explained.

The photodetection device of the present invention is also performed with a circuit such that the source and drain are exchanged in FIG. 1. That is, the circuit that the reset MOS FET is connected to the gate of the input J FET 2 and the drain of this MOS FET is connected to the switch S2 and resistor R2.

Figure 2:
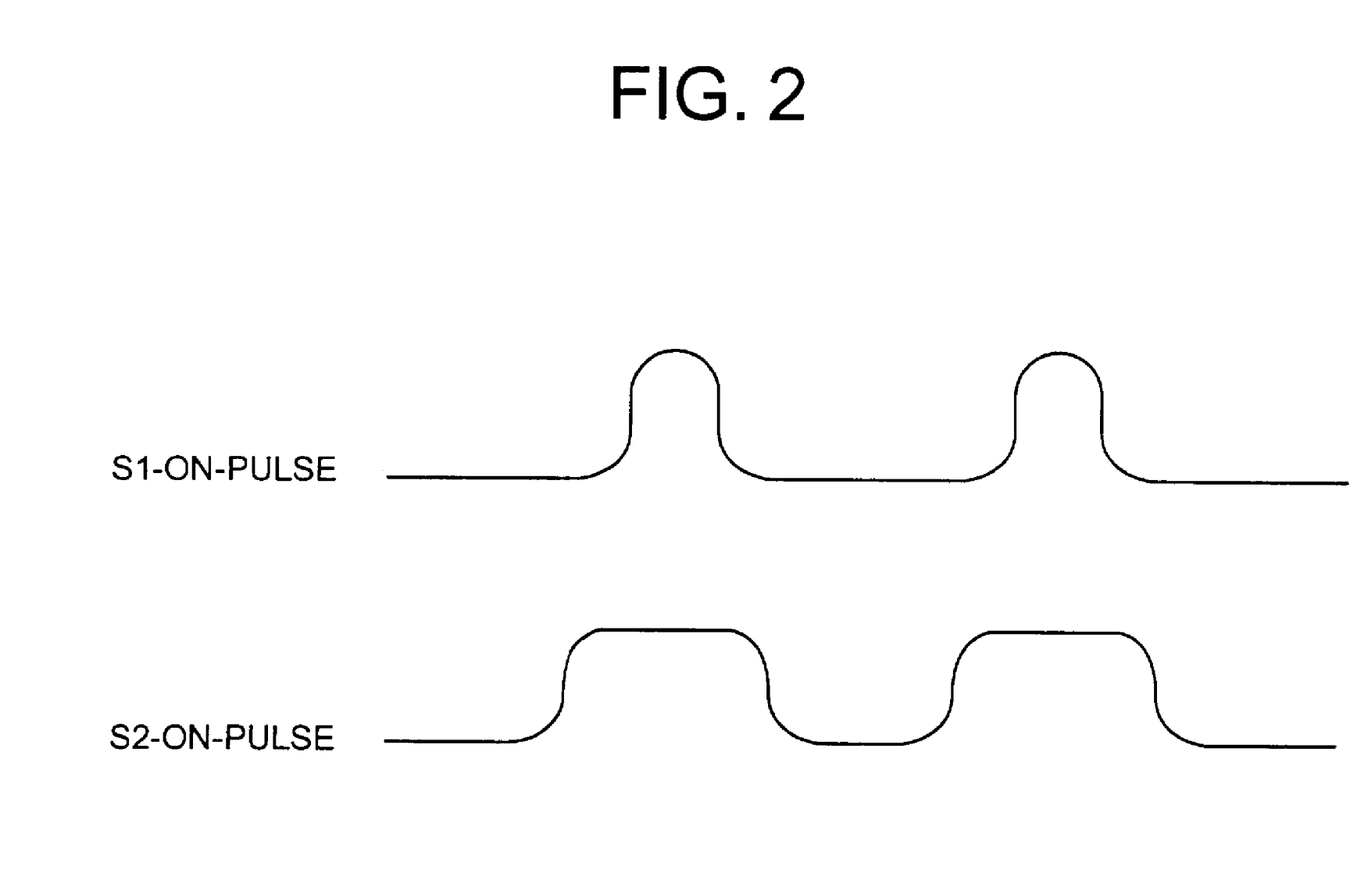
FIG. 2 shows drawings of timing charts of the reset in the circuit example of the photodetection device A of the present invention.

FIG. 2 gives timing charts for the example circuit of photodetection device A. In FIG. 2, S1-on pulses are pulses to turn the reset MOS FET S1 for resetting "on", and S2-on pulses are pulses to turn the switch S2 "on". Turning the reset MOS FET S1 and switch S2 "on" and "off" must be controlled timely for the CTIA circuit to operate stably. The timing chart is given in FIG. 2.

Careful attention is necessary in using a J FET as the element for reading out of the photodetector in the CTIA circuit of FIG. 1. As well as the photodetector itself and the reset MOS FET S1, the input J FET 2 contributes leakage current. However, this leakage current diminishes over time, with the noise level dropping below $10^{-18}$ after from a few to ten hours.

While this is so, applying a voltage other than the voltage which had been across the gate and drain or gate and source of the input J FET 2 increases the leakage current. The time this leakage current takes to disappear, i.e., for the suddenly increased leakage current to return to the original leakage current, is the same as was described above. Such voltage changes happen at the time of resetting in particular. In addition, when the edge of the reset pulse becomes sharp enough, the op amp. is unable to follow the pulse because the voltage change is too sudden and the input J FET 2 induces a DC-voltage drift.

These problems are solved by always keeping the voltage applied to the input J FET 2 at the same level, even keeping it at the voltage before the reset through a reset. The switch S2 has to be "off" for charging of the feed-back capacitor and "on" for a reset. However if the reset MOS FET S1 is "on" before the switch S2 is switched "on" in a reset, the voltage Vg is applied to the input gate of the input J FET 2 through the reset MOS FET S1 and resistor R2 , because the reset MOS FET S1 is not connected to the feed-back circuit.

As the result, the op amp. 3 goes into saturation in either the positive or negative direction, because the feed-back from the op amp. 3 to the gate is not being carried out. After this, when the switch S2 is turned "on", the feed-back circuit is connected to the reset MOS FET S1. In that situation, some time is needed for the op amp. 3 to recover from its saturation state; during this time, the gate voltage varies greatly over a short period. This fluctuation causes problems.

The reset MOS FET S1 and the switch S2 are thus controlled in the way shown in the timing chart. As is shown in FIG. 2, it is important that the switch S2 is already "on" when the reset MOS FET S1 is turned "on".

When control is in this way, the op amp. 3 always controls the circuit, regardless of the state of the reset MOS FET S1 for resetting, so the gate voltage of the input J FET 2 for readout can be kept constant.

A significant feature of the time chart shown in FIG. 2 is that the rises and falls are not sharp. Let us consider the pulses of the timing chart in FIG. 2; if the pulses which control the switch 2 rise too sharply, the pulses induce a variation in the voltages of J FET 2. When the pulses are applied to the control part of the switch S2 (if it is a MOS FET, its gate), the signal is applied to the CTIA circuit through the feed-back capacitor. If the signal change is too rapid, the op amp.3 will be unable to follow the signal. This causes some problems.

(ii) Explanation of the Example Circuit of Photodetection Device B

FIG. 3 shows an example of the circuit of photodetection device B. As is shown in FIG. 3, the circuit example of the photodetection device B is comprised of photodetector 1 for the detection of incident light, input J FET 2 for reading out of the sensing signal from the photodetector, op amp. 3 for amplifying the signal detected by the input J FET 2, a feed-back circuit for feeding of the output of the amplifier back to the gate of the input J FET 2 through a feed-back capacitor 4, a reset circuit for resetting by discharging the charge of the feed-back capacitor 4 through a reset pn-junction element S3 and a circuit made up of a switch and resistor R2. The same level of voltage as the gate voltage $V_G$ of the input J FET 2 is applied to the reset pn-junction element S3 through the resistor R2, and the circuit of switch S2 and resistor R1 are connected between the reset pn-junction element 3 for resetting of the feed-back capacitor. The circuit has feature that, following turning the second switch to "on", the first switch turns automatically to "on".

The photodetection device B improves on some problems which arise with the photodetection device A and are described below. In the present invention, the polarization noise comes to determine the limit of detection for the incident light as the capacitance of the photodetector falls. The polarization noise occurs because of fluctuations in the dielectric polarization of matter, and increases in proportion to dielectric loss.

As the dielectric loss is a kind of resistive loss, it acts in the same way as the thermal noise (Johnson noise) that occurs in a resistor. The polarization noise is generated in the gate-circuit elements of the input J FET 2, that is, all elements and materials that are connected to the gate of the input J FET 2, such as the sensor 1 and the input J FET 2 itself.

Of the elements of the gate-circuit of the photodetection device A, the reset MOS FET S1 is the greatest contributor of noise. This is because imperfect crystallization of the film of silicon oxide or nitride which separates the gate of the MOS FET from its channel leads to increased dielectric loss. The reset MOS FET S1 used in the photodetection device A generates the polarization noise of more than two times of all polarization noise generated by elements other than the MOS FET S1.

Thus, in circuit example 2, we eliminate the reset MOS FET S1 which was used as the switch S1 in the photodetection device A, and replace this reset MOS FET S1 with a reset pn-junction element. Either a J FET or photodiode may provide this reset pn-junction element. A J FET can be used as the pn-junction element when a pair of its electrodes have been connected with each other. It is, however, best to use as small a capacitance as is possible. This is because a lower capacitance is accompanied by less polarization noise and leakage current.

With the exchange of the reset MOS FET S1 for a reset pn-junction element, the reset circuit changes to become as shown in FIG. 3. As current does not flow in the pn-junction element unless a forward voltage is applied across it, the p side of the pn-junction element S3 is connected to the output of op amp. 3 when the output of the op amp. 3 enters the positive voltage range during charging of the feed-back capacitor 4, as is shown in FIG. 3. Whether a pn-junction or PIN-junction is used as the pn-junction element, its direction is the same as the direction of photodiode 1 with respect to the gate of the J FET (see FIG. 3).

In addition, current does not flow in the reset pn-junction element S3 unless the applied voltage is greater than some fixed positive voltage. For example, applying a voltage of somewhat more than 0.5 V in the forward direction is necessary for a silicon element; R1 and R2, which divide the output of op amp. 3, should thus be selected so that the voltage applied to the element's p-side is not too low.

The value is determined on the basis of the post-reset voltage desired for the output of op amp. Now let us consider to make the gate voltage Vg to 0V, and the output of the op amp.3 1V. When the gate voltage is 0V, the output voltage of the op amp. 3 is about 0.5*(R1 +R2)/R2. Thus, the resistors are selected as R1=R2. In this way, the ratio of the values R1 and R2 is not important, however the absolute value is important. Because too small the value leads to over-current flowing in the pn-junction element S3 for resetting, and +may damage the elements.

This method of resetting has other merits. The reset pulses required for the photodetection device A are not required with the reset pn-junction element S3 for resetting, so the circuit is simpler. Because, in the circuit, following turning the second switch into "on", the first switch turns automatically to "on". The reset pulse is not needed thus, and the circuit is simplified.

The photodetection devices of the present invention are used to detect rays of wide wavelength range such as from far infrared rays to visible rays. The light detecting sensitivity is high in measurement at cryogenic temperature. Especially the photodetector is cooled down to the liquid Helium temperature for making its sensitivity high, when detecting the far infrared rays. A photodetector made of compound semiconductor is suitable for measuring in liquid Helium temperature.

The photodetector 1 and the input J-FET are used usually in a body united each other. When the material of the photodetector 1 is different with that of the J-FET 2, the substrate of the photodetefdtor 1 is united back to back with that of the J-FET by using the technique of direct hybridization.

When each of the input J-FET, the pn-junction element S3 and the switch S3 is made of the same material, all the elements may be mounted on a substrate. This is very convenient to make a two-dimensional array photodetector. Because the substrate of photodetector and the shared substrate of the three elements are united into one body easily with the direct hybridization.

This is because the sensitivity of a long-wavelength photodetector is not high unless it is kept at cryogenic temperatures. While a GaAs J FET can operate at cryogenic temperatures, a MOS FET cannot be made of GaAs. Using a GaAs J FET as the reset switch S1 may thus be considered; however, the "off" resistance of a GaAs J FET is far lower than that of MOS-type FETs in general. For this reason, the GaAs J FET cannot be used as the reset switch of a prior art CTIA circuit.

The switch S2 is inserted in the circuit only to make the pn-junction element S3 "off" in time for charging of the feed-back capacitor. For this reason, high off resistance of the switch S2 is not needed and a J FET is usable as the switch S2. So the switch S2 may be composed of the same material with the input J-FET 2 and the pn-junction element S3. Thus all of the elements are made of the compound semiconductor such as GaAs to integrate the elements, which makes fabrication of the photodetection device very easy, as mentioned above.

(iii) Explanation of the Example Circuit of Photodetection Device C

FIG. 4 shows an example of the circuit of the photodetection device C. In the example of the circuit for photodetection device C, the GaAs J FET is used as the input J FET 2 and switch S2, with a GaAs pn-junction element S4 as the reset pn-junction element S3. Further points regarding this embodiment are explained in the following passages.

As is shown in FIG. 4, the example circuit of the photodetection device C is comprised of a photodetector 1 for detecting incident light, an input GaAs J FET 5 for reading out of the sensing signal from the photodetector, an op amp. 3 for amplifying the signal detected by the input GaAs J FET, a feed-back circuit for feeding of the output of the op amp.3 back to the gate of the input GaAs J FET 5 through a feed-back capacitor 4, a reset circuit for resetting feed-back capacitor 4 by discharging its charge through a reset GaAs pn-junction element S4 for resetting, and a circuit of switch S2 and resistor R1. Voltage at the same level as the gate voltage $V_G$ of the input GaAs J FET 5 is applied to S4 through a resistor R2, and the switch S2 composed of a GaAs J FET is connected between the S4 and, via the resistor R1, to the feed-back capacitor 4.

The input GaAs J FET can operate at temperatures below liquid helium temperature (4.2 K). Sensitivity is thus improved by using an input GaAs J FET 5 for reading out of the signals detected by the photodetector, which is highly sensitive to long-wavelength light, and also by using the GaAs J FET as the switch S2 and by having operation at cryogenic temperatures.

In addition, when GaAs pn-junction element S4 is used as the reset switch of the reset circuit, all of the circuit elements can be made of GaAs. In this case, fabrication of the photodetection device C is eased by using the same techniques for all of the GaAs elements. Since the reset can be carried out by simply applying forward voltage to the GaAs pn-junction element S4, and following turning the switch S2 to "on", the forward voltage is automatically applied. Thus the reset circuit is further simplified.

In the explanation given above, when the op amp.3 does not work at a cryogenic temperature, all the elements other than the op amp. 3 are placed at a cryogenic temperature. When the op amp.3 works at a cryogenic temperature, all the elements including the op amp.3 are placed at a cryogenic temperature. However, the photodetector, input GaAs J FET 5, GaAs J FET switch S2 and GaAs switch S1 can operate also at a room temperatures in the present invention. The inventor of the present invention found that, even when all of the elements are placed at room temperature, the circuit operates and produces fine results, just as it does in cryogenic operation.

A reset circuit in which the pn-junction element is used as the reset switch is not only applicable to CTIA circuits, but is also applicable to CIA circuits. In a CIA circuit, reading of voltage generated in the photodetector is by a FET for reading out of the detected signals; the feed-back circuit is not used in the CTIA circuit (see FIG. 5). In this case, the reset can be carried out by applying a forward voltage to the reset pn-junction element.

(iv) Explanation of the Example Circuit of Photodetection Device D

FIG. 5 shows an example of the circuit of the photodetection device D. The photodetection device D is comprised of a photodetector 1 for detecting incident light, a J FET 2 for reading out of the detection signals from photodetector 1, a pn-junction element S3, which is connected to the gate of the input J FET 2 and is for resetting of charge accumulation in the input J FET 2, and a switch 6. The switch 6 controls to turn the pn-junction element S3 to "on" or "off". The means of control for control of the switch S6 is not shown in FIG. 5.

In this case the photodetector 1 and reset pn-junction element S3 are connected mutually at the same-polarity terminal, and the photodetector 1 and reset pn-junction element S3 are connected in parallel between the gate of the input J FET 2 and GND.

In reading of the detected signals, the switch 6 is connected to its GND electric potential (earth potential) side to turn the pn-junction element S3 "off". In resetting, the switch 6 is connected to the voltage V side to turn the pn-junction element S3 "on". When the pn-junction element S3 for resetting is turned "on" in this way, the charge accumulated in the capacity of the pn junction of photodetector 1 and/or the gate circuit of the J FET 2 is discharged and the circuit is reset.

(v) Example Circuit of the Photodetection Device E.

FIG. 6 shows an example of the circuit of the photodetection device E. The example circuit of the photodetection device E reduces noise in the case where a large-capacitance photodetector is used in any of the above-mentioned photodetection devices, A-D.

As was mentioned above, the polarization noise is dominant when the capacitance of the photodetector 1 is small. However, the noise of the input J FET 2 (see circuit examples 1, 2, and 4) and of the input GaAs J FET 5 (see circuit example 3) becomes a problem when the capacitance of the photodetector 1 is large.

If the capacitance of the photodetector 1 is C, and the noise voltage of the circuit for reading out of the detected signals is Vn, the noise current of the readout circuit is $\omega C \cdot Vn$. Noise thus increases in proportion to the capacitance of the photodetector 1. Thus, when the capacitance of the photodetector 1 increases, the noise (input-referred noise, henceforth referred to as noise) of the J FET is dominant.

Under this condition, enlarging the size of photodetecting area of the photodetector to increase the amount of light incident on the photodetector 1 does not improve the S/N ratio at all, because of the proportionate increase in capacitance. The present invention provides a serial connection device of the photodetectors which resolves this problem.

Here, we prepare a photodetector A with a photo-sensing area S/n that of a standard photodetector B, the detection-surface area of which is S, placing n such photodetectors A parallel with each other and then electrically connecting them in series with each other. In this case, the capacitance of one photodetector is 1/n of the original one; as they are connected in series with each other, the capacitance is reduced to $C/n^2$, where C is the capacitance of the photodetector B.

The amount of incident light on each photodetector is 1/n of the amount for the original one; when they are connected in series with each other, the photo current of each of the n photodetectors thus connected is 1/n, and the total light-incident area is the same as for the photodetector B. When we consider the noise as separate J FET noise and polarization noise components, we see that the J FET noise is reduced to $1/n^2$ of the original value, i.e., in proportion to the reduction in capacitance.

However, the polarization noise is reduced at the rate of 1/n, because the polarization noise is proportional to the root of the capacitance. Increasing n thus reduces the noise of the J FET more rapidly than the photo-current, which improves the S/N. With increasing "n", however, the noise of the J FET becomes smaller than the polarization noise at some "n", and the polarization noise then becomes the dominant form of noise. In that situation, the reduction in noise is at the rate of 1/n. Since the photo-current is also reduced at the rate of 1/n, the S/N ratio does not change. That is, this method is effective in those cases where the noise of the J FET is dominant. Furthermore, under this condition, the leakage current and shot noise are reduced at the rate of 1/n and $1/n^{1/2}$ respectively, so there is less reduction in the noise than in the photo-current, and the S/N is reduced. The situation for the photo-current is the same, so the method has the opposite effect when the leakage current or shot noise of the photo-current is dominant.

FIG. 6 shows an embodiment of what is described above. In FIG. 6, (a) shows a prior-art photodetector (see FIG. 7), (b) shows the area of the photodetector 1 divided up into n devices (that is, preparing devices each having a light-incident area of 1/n), (c) shows the placement of the photodetectors parallel with each other, and (d) shows the series electrical connection of the n photodetectors. The characteristics of (a)-(d) are as follows.

(1) Concerning area, let the area in (a) be S (mm$^2$) and the area in (b) be S/n (mm$^2$/unit) per photodetector; the total area in (c) and (d) is then S(mm$^2$).

(2) Concerning capacitance, let the value in (a) be C (pF) and the capacitance in (b) be C/n (pF/unit) per photodetector; the total capacitance in (c) and (d) is then $C/n^2$ (pF).

(3) Concerning photo-current, let the current in (a) be I(A) and the current in (2) be I/n (A/unit) per photodetector; the total current in (c) and (d) is then I/n (A).

(4) Concerning FET noise, let the noise in (a) be $I_{FET}$ (A) and the noise in (b) be $I_{FET}/n$ (A/unit) per photodetector; the total noise in (c) and (d) is then $I_{FET}/n^2$ (A).

(5) Concerning polarization noise, let the noise in (c) be $I_P$ (A) and the noise in (b) be $I_P/n^{1/2}$ (A) per photodetector; the total noise in (c) and (d) is then $I_P/n$ (A).

(6) Concerning shot noise, let the noise in (a) be $I_P$ (A) and the noise in (b) be $I_S/n^{1/2}$ (A) per photodetector; the total noise in (c) and (d) is then $I_P/n^{1/2}$ (A).

The n photodetectors are placed so that the input light is guided to the light-incident area of each photodetector and the photodetectors are electrically connected in series with each other to realize the photodection device shown in FIG. 6. Otherwise, n photo-incident areas may be formed on one substrate and electrically connected in series to act as one sensor.

In the example circuits shown in FIG. 1-FIG. 6, elements other than op amp. 3, that is, photodetector 1, J FET 2, the switch S1 or S5 and the switch S2, and resistors R1 and R2 etc., are used in a cryogenic vessel that is cooled to a cryogenic temperature (for example, 77K). For example, op amp.3 is kept at room temperature but the other devices are placed in a liquid-nitrogen cryostat.

However, a situation where some of these other devices, such as the switch S2 and op amp. 3, are at room temperature while the other elements are at cryogenic temperature is also allowed. Furthermore, even when all of the elements are at room temperature, effective noise reduction is realized.

The many features and advantages of the present invention are apparent from the detailed specification and the appended claims are thus intended to cover all such features and advantages of the invention as fall within the true spirit and scope of the invention. Further, since numerous modifications and changes will readily occur to those skilled in the art, it is not desired to limit the invention to the exact constructions and operations that have been illustrated and described; accordingly, all suitable modifications and equivalents which fall within the scope of the invention may be included in the present invention.

What is claimed is:

1. A photo-detecting device comprising:
   a photodetector for detecting incident light;
   an input J FET for reading out the sensing signal from the photodetector;
   an amplifier for amplifying the signal obtained by the input FET;
   a feed-back circuit for feeding the output of the amplifier back to the gate of the input FET through a feed-back capacitor;
   a reset circuit for resetting the feed-back capacitor;
   a reset MOS FET in the reset circuit for discharging the feed-back capacitor to reset the capacitor;
   a circuit of a switch and resistor;
   wherein the same voltage level as the gate voltage of the input FET element is applied to the source (or drain) of the reset MOS FET through a resistor, a circuit of switch S2 and resistor is connected between the source (or drain) of the reset MOS FET and the feed-back capacitor, and the reset MOS FET and switch S2 are controlled so that the reset MOS FET is turned "on" and "off" while the switch S2 is "on".

2. A photo-detecting device in claim 1, wherein the input FET element is J FET.

3. A photo-detecting device in claim 1, wherein the input FET element is MOS FET.

4. A photo-detecting device comprising:
   a photodetector for detecting incident light;
   an input J FET for reading out the sensing signal from the photodetector;
   an amplifier for amplifying the signal obtained by the input J FET;
   a feed-back circuit for feeding the output of the amplifier back to the gate of the input J FET through a feed-back capacitor;
   a reset circuit for resetting the feed-back capacitor;
   a reset pn-junction element in the reset circuit for discharging the feed-back capacitor to reset the capacitor; and
   a circuit of switch S2 and resistor;
   wherein the same voltage level as the gate voltage of the input J FET is applied to the anode (or cathode) of the reset pn-junction element through a resistor, a circuit of switch S2 and resistor is connected between the anode (or cathode) of the reset pn-junction element and the feed-back capacitor; and
   following turning the switch S2 "on", the reset pn-junction element turns "on".

5. The photo-detecting device as in claim 4, wherein the input J FET, the reset pn-junction element, and the switch S2 are made of compound semiconductor respectively.

6. The photo-detecting device as in claim 5, wherein the compound semiconductor is GaAs.

7. A photo-detecting device comprising:
   a photodetector for detecting incident light;
   an input J FET for reading out the sensing signal from the photodetector;
   a reset pn-junction element for discharging the accumulated charge in the input J FET and/or the photodetector to reset the input J FET and/or the photodetector;
   a switch for turning the reset pn-junction element "on" or "off"; and a means for controlling the switch.

8. A photodetection device comprising:
   a photodetector for detecting incident light;
   a signal readout element for reading out the detection signal of the photodetector;
   an amplifier for amplifying the readout signal from the signal readout element;
   a feed-back circuit to feed the output of the amplifier back to the gate of the signal readout element through a feed-back capacitor;
   a reset circuit for resetting the feed-back capacitor;
   a first reset switch in the reset circuit for discharging the the feed-back capacitor to reset the capacitor;
   a second reset switch connected between the first reset switch and the feed-back capacitor, wherein the first reset switch is connected between the gate of the signal readout element and the output of the amplifier through the second reset switch.

9. A photo-detecting device in claim 8, wherein, following turning the switch S2 "on", the reset pn-junction element turns automatically to "on".

10. A photo-detecting device in claim 8 comprising:
    a means for controlling the first switch and the second switch;
    wherein the means controls the first reset switch and then the second reset switch so that the first reset switch is turned "on" and "off" while the second reset switch is "on".

11. A photo-detecting method for a photodetection device that comprises a photodetector for the detection of incident light; a signal readout element for reading out of the signal detected by the photodetector; an amplifier for amplifying the signal readout by the signal-readout element; a feed-back circuit for feeding the output of the amplifier back to the gate of the signal-readout element through a feed-back capacitor; a reset circuit for resetting the feed-back capacitor; a first switch in the reset circuit for discharging the feed-back capacitor; and a second reset switch connected between the first reset switch and the feed-back capacitor, wherein the first switch is connected between the gate of the signal readout element and the output of the amplifier via the second reset switch comprising that:
   the first reset switch and second reset switch are controlled so that the first reset switch is turned "on" and "off" while the second reset switch is "on".

12. The photo-detecting method in claim 11, wherein the signal-readout element is a J FET element and the first switch is a MOS FET.

13. The photo-detecting method in claim 11, wherein both of the signal-readout element and the first switch are MOS FET.

14. A photo-detecting method for a photodetection device that comprises a photodetector for the detection of incident light; a signal readout element for reading out of the signal detected by the photodetector; an amplifier for amplifying the signal readout by the signal-readout element; a feed-back circuit for feeding the output of the amplifier back to the gate of the signal-readout element through a feed-back capacitor; a reset circuit for resetting the feed-back capacitor; a first reset switch in the reset circuit for discharging the feed-back capacitor to reset the capacitor; and a second reset switch connected between the first reset switch and the feed-back capacitor, wherein the first switch is connected between the gate of the signal readout element and the output of the amplifier via the second reset switch comprising that:

following turning the second switch to "on", the first switch turns to "on".

15. The photo-detecting method in claim 14 wherein the signal-readout element is a JFET and the first switch is a pn-junction element.

16. The photo-detecting method in claim 14 wherein the signal-readout element is a compound-semiconductor J FET, the first switch is a compound-semiconductor pn-junction element.

17. The photo-detecting method in claim 14 wherein the signal-readout element and the second switch are a compound-semiconductor J FET, the first switch is a compound-semiconductor pn-junction element.

18. The photo-detecting method of claim 14 wherein the signal-readout element is a compound-semiconductor J FET, the first switch and the second switch are a compound-semiconductor pn-junction element respectively.

19. The photo-detecting method of claim 14, wherein the signal-readout element is a compound-semiconductor J FET, the first switch is a compound-semiconductor pn-junction element.

* * * * *

UNITED STATES PATENT AND TRADEMARK OFFICE
CERTIFICATE OF CORRECTION

PATENT NO. : 7,479,999 B2
APPLICATION NO. : 10/394247
DATED : January 20, 2009
INVENTOR(S) : Makoto Akiba It is certified that error appears in the above-identified patent and that said Letters Patent is hereby corrected as shown below:

On the Title Page, Item (57) (Abstract), Line 1, change "includes of a" to --includes a--.

Column 1, Line 7, change "2002-038102" to --2002-085102--.

Column 16, Line 16, change "discharging the the" to --discharging the--.

Column 16, Line 24, change ""on". the" to --"on" the--.

Column 17, Line 6, change "JFET" to --J FET--.

Signed and Sealed this

Seventh Day of April, 2009

JOHN DOLL
*Acting Director of the United States Patent and Trademark Office*